United States Patent [19]

Kluger et al.

[11] 4,222,467
[45] Sep. 16, 1980

[54] DRUM BRAKE ADJUSTER

[75] Inventors: Michael A. Kluger; Robert T. DuCharme, both of South Bend, Ind.

[73] Assignee: The Bendix Corporation, Southfield, Mich.

[21] Appl. No.: 8,729

[22] Filed: Feb. 2, 1979

[51] Int. Cl.² .................................................. F16D 65/56
[52] U.S. Cl. ........................ 188/79.5 GE; 188/79.5 P; 188/196 BA; 192/111 A
[58] Field of Search ............... 188/79.5 GE, 79.5 GC, 188/79.5 GT, 79.5 K, 79.5 P, 79.5 S, 196 BA; 192/111 A, 111 T

[56] References Cited

U.S. PATENT DOCUMENTS

| 2,378,662 | 6/1945 | Shuman | 188/79.5 GT |
| 2,389,618 | 11/1945 | Goepfrich | 188/79.5 GE |
| 3,706,360 | 12/1972 | Nyunoya | 188/196 BA X |
| 4,101,011 | 7/1978 | Burnett | 188/196 BA X |

FOREIGN PATENT DOCUMENTS

| 1402527 | 8/1975 | United Kingdom | 188/79.5 GE |
| 1406069 | 9/1975 | United Kingdom | 188/79.5 GE |

Primary Examiner—George E. A. Halvosa

Attorney, Agent, or Firm—Paul D. Schoenle; Ken C. Decker

[57] ABSTRACT

The present invention relates to an improved drum brake assembly having an automatic adjuster to compensate for lining wear to a pair of brake shoes. A backing plate includes an anchor to pivotally support the pair of brake shoes and to secure a hydraulic actuator thereto. An extendible member cooperates with the pair of brake shoes to define a non-braking position and the hydraulic actuator is operable to move the pair of brake shoes to a braking position in engagement with a rotatable member. A pawl is pivotally engageable with the extendible member and the hydraulic actuator via a spring extending from one of the pair of brake shoes to the pawl so as to pivot when the hydraulic actuator is operable. The pivoting of the pawl causes the pawl to extend the extendible member if the movement of the pair of brake shoes is above a predetermined value. The pawl includes an arm which is pivotally engageable with a piston of the hydraulic actuator. The arm also defines an arcuate abutment between the other brake shoe and the hydraulic actuator. In addition a parking lever may also be pivotally engageable with the hydraulic actuator and define another arcuate abutment opposing the one brake shoe.

8 Claims, 4 Drawing Figures

DRUM BRAKE ADJUSTER

BACKGROUND OF THE INVENTION

Heretofore, a drum brake assembly pivoted an adjusting pawl on one brake shoe and engaged the pawl with a ratchet wheel of an extendible member to provide for adjustment of the extendible member when the running clearance between a pair of brake shoes and a rotatable member was excessive. In addition, a parking lever was pivotally mounted to the one brake shoe or the other brake shoe and engaged with the extendible member so as to move the pair of brake shoes from a non-braking position to a braking position when the parking lever was rotated or moved by a vehicle operator.

Moreover, a hydraulic actuator was operable to move the pair of brake shoes to the braking position. The hydraulic actuator included a pair of pistons which carried hardened stops or plugs to engage the pair of brake shoes, so as to protect the pistons at the point of contact with the pair of brake shoes.

SUMMARY OF THE INVENTION

The present invention relates to an improved drum brake assembly having an automatic adjuster which compensates for lining wear on a pair of brake shoes. A hydraulic actuator includes a pair of pistons which cooperate with the pair of brake shoes to move the latter from a non-braking position to a braking position when the hydraulic actuator is actuated. An extendible member is engageable with the pair of brake shoes to substantially define the non-braking position and a pawl cooperates with the extendible member to extend the latter when a running clearance between the pair of brake shoes and a rotatable member is above a predetermined value. A parking lever is engageable with the extendible member to also move the pair of brake shoes to the braking position in response to a parking application by a vehicle operator.

In accordance with the invention the pawl or parking lever, or both, define arcuate abutments which are disposed between the hydraulic actuator pistons and a respective brake shoe. The abutment on the parking lever pivotally engages one of the pistons in the hydraulic actuator and one of the pair of brake shoes, while the abutment on the pawl pivotally engages the other piston and other brake shoe. A resilient member extends between the one brake shoe and the pawl to retract the pair of brake shoes to the non-braking position subsequent to a braking application.

It is an object of the present invention to provide an adjustment pawl in a drum brake assembly which defines an arcuate abutment surface between a brake shoe and a piston in a hydraulic actuator. The abutment surface also permits pivoting of the adjustment pawl relative to the hydraulic actuator.

DETAILED DESCRIPTION

Figure 1:
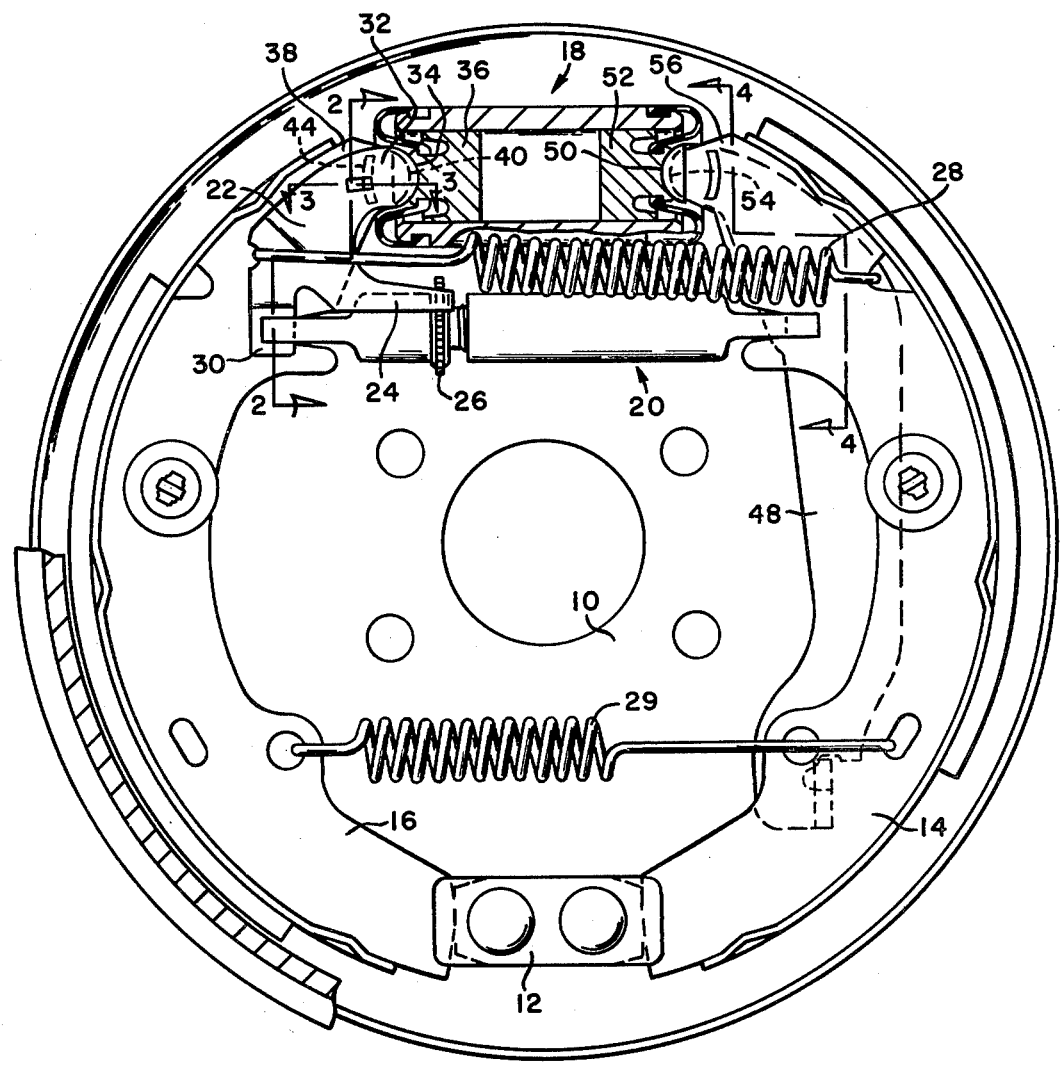
FIG. 1 is a front view of a drum brake assembly.

The drum brake assembly of FIG. 1 is generally referred to as a non-servo drum brake having a backing plate 10 which includes includes an anchor 12 to receive torque developed by a pair of brake shoes 14 and 16. The backing plate also carries a hydraulic actuator 18 which receives pressurized fluid during a brake application to expand the pair of brake shoes from a non-braking position to a braking position. The non-braking position is substantially defined by an extendible member 20 which is engageable with the pair of brake shoes to limit retraction of the latter subsequent to a brake application. In order to extend the extendible member 20, a pawl 22 includes a first arm 24 which is engageable with a ratchet wheel 26 on the extendible member 20 and a resilient member 28 extends from the one brake shoe 14 to the pawl 22. If the brake shoes wear and the movement of the brake shoes from a non-braking position to a braking position is above a predetermined value, the pawl is pivoted counterclockwise so as to index above a successive tooth on the ratchet wheel 26. Upon termination of braking, the resilient members 28 and 29 retract the pair of brake shoes to the non-braking position. Moreover, the pawl pivots in a clockwise direction thereby rotating the ratchet wheel and extending the extendible member 20.

Figure 2:
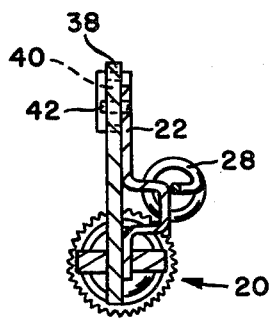
FIG. 2 is a left side view of an adjustment pawl which is shown in FIG. 1.

The pawl 22 includes a second arm 30 biased by resilient member 28 into engagement with the extendible member 20 and a third arm 32 of the pawl substantially defines an arcuate abutment 34 engaging the wheel cylinder 18. In particular, the abutment 34 pivotally engages a piston 36 of the hydraulic actuator 18 and the piston 36 includes an arcuate recess for receiving the abutment 34. The brake shoe 16 terminates in an end 38, which is preferably of arcuate shape, and which engages the abutment 34 opposite the piston 36. Viewing FIGS. 2, and 3 the abutment 34 forms a pocket 40 to pivotally receive the end 38 of the brake shoe 16. A tab 42 extends from the pawl 22 and is inserted in a slot 44 on the brake shoe 16. The tab 42 provides for retraction of the brake shoe 16 by the resilient member 28 when hydraulic pressure is released from the hydraulic actuator 18.

Figure 3:
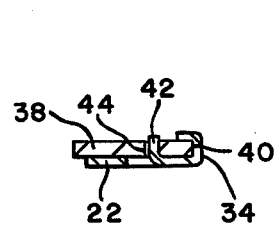
FIG. 3 is a right side view of a parking lever which is shown in FIG. 1.
Figure 4:
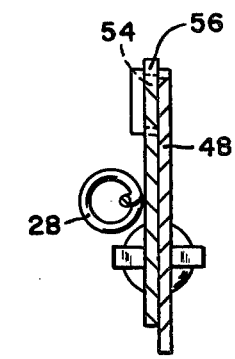
FIG. 4 is a cross-sectional view taken along line 4—4 of FIG. 1.

A parking lever 48 forms arcuate abutment 50 at one end in engagement with piston 52 of the hydraulic actuator 18. The abutment 50 forms a pocket 54 for pivotally receiving an end 56 of the brake shoe 14, substantially as shown in FIG. 3, and the abutment 50 is pivotally received within a recess on the piston 52.

MODE OF OPERATION

When a brake application is initiated, the pistons 36 and 52 are urged outwardly from the hydraulic actuator 18. The pistons 36 and 52 bias the abutment 34 on the pawl and the abutment 50 on the parking lever to move away from the hydraulic actuator 18. As a result the abutment 34 pivots and slides relative to the piston 36. The resilient member 28 bias the pawl arm 30 and the extendible member 20 to move to the right with the brake shoe 14 while the piston 36 biases the pawl arm 32 to move to the left so that the arm 24 is movable relative to the ratchet wheel 26. If the pair of brake shoes move through an excessive distance from the non-braking position to the braking position, the arm 24 will position itself over a successive tooth on the ratchet wheel so that upon retraction of the pair of brake shoes, the arm 24 will engage the successive tooth and cause the ratchet wheel to rotate thereby extending the length of the extendible member. The increased length of the extendible member cooperates with the pair of brake shoes to adjust the non-braking position closer to the braking position. When the parking lever 48 is actuated to rotate in a clockwise direction, viewing FIG. 1, the abutment 50 pivots and slides relative to the piston 52. Moreover, the extendible member 20 is moved to the left to bias the brake shoe 16 away from hydraulic actuator 18, while the pocket 54 on the rotating parking lever 48 biases the brake shoe 14 away from the hydraulic actuator.

From the foregoing description it is seen that the arcuate abutments 34 and 50 separate the brake shoes from the hydraulic actuator while transmitting movement from the hydraulic actuator to the brake shoes. The abutments form pivotal connections with each respective brake shoe in the absence of connecting pins or the like. The arcuate abutment 34 on the pawl is directly engageable with the piston 36 so that the pawl begins to rotate as soon as the piston 36 of the hydraulic actuator moves. Moreover, the abutment 50 is retained between the piston 52 and the brake shoe end 56 via the resilient members 28 and 29 which bias the brake shoe 14 and the abutment 50 toward the hydraulic actuator 18.

We claim:

1. In a drum brake assembly having a pair of brake shoes which are movable by a hydraulic actuator from a nonbraking position to a braking position, an extendible member cooperating with the pair of brake shoes to substantially define the nonbraking position, a pawl substantially defining an arcuate abutment and engageable with the extendible member to extend the latter in response to excessive movement of the pair of brake shoes from the nonbraking position to the braking position, said arcuate abutment forming a pocket, a resilient member engageable with the pawl to impart rotation to the pawl when the pair of brake shoes move from the nonbraking position to the braking position, characterized by the pawl being pivotally engaged with the hydraulic actuator at said arcuate abutment and with one of said brake shoes at said pocket so as to pivot relative to the extendible member when the hydraulic actuator is operable.

2. The drum brake assembly of claim 1 in which the pawl includes a first arm pivotally engaging the extendible member and a second arm pivotally engaging the hydraulic actuator and one of said brake shoes.

3. In a drum brake assembly having a pair of brake shoes which are movable by a hydraulic actuator from a non-braking position to a braking position, an extendible member cooperating with the pair of brake shoes to substantially define the non-braking position, a pawl engageable with the extendible member and cooperating therewith to extend the extendible member when the movement of the pair of brake shoes from the nonbraking position to the braking position is above a predetermined value, and a resilient member extending between one of the pair of brake shoes and the pawl to impart rotation to the pawl when the one brake shoe is moved from the non-braking position, characterized by the pawl including an arcuate abutment which directly pivotally engages said hydraulic actuator and one of said brake shoes.

4. The drum brake assembly of claim 3 in which the pawl includes a pocket for receiving the one brake shoe, said pocket defining at least in part said arcuate abutment.

5. The drum brake assembly of claim 3 in which the pawl includes a tab and the one brake shoe includes a slot for receiving said tab, said tab cooperating with the one brake shoe to retract the same to the non-braking position from the braking position and said slot permitting said pawl to pivot relative to the one brake shoe.

6. In a drum brake having a hydraulic actuator cooperating with a pair of brake shoes to urge the latter to a position in engagement with a rotatable member during braking, an adjustment mechanism of the type including an extendible member engaging the pair of brake shoes to substantially define a nonbraking position for the brake shoes, a resilient member cooperating with said brake shoes to urge them toward their nonbraking position, a pawl pivotally mounted relative said extendible member and engageable therewith to provide extension of said member in the event of excessive movement of said brake shoes between their nonbraking and engagement positions, the improvement wherein said pawl includes a first arm engaging said extendible member and a second arm, said second arm defining an arcuate abutment and a pocket, said abutment in part defining said pocket, said actuator having an arcuate recess pivotally receiving said abutment, one of said brake shoes terminating in an end of arcuate shape, said arcuate brake shoe end being pivotally received in said pocket whereby said pawl is pivoted relative to said one brake shoe and said actuator upon brake actuation to provide for extension of said extendible member.

7. The adjustment mechanism of claim 6 wherein said resilient member extends between said pawl and said other brake shoe and said pawl includes means cooperating with the one brake shoe to resiliently maintain it in its nonbraking position in response to tension communicated through said pawl from said resilient member.

8. The adjustment mechanism of claim 7 wherein said means cooperating with the one brake shoe includes a tab formed on one of said pawl and one brake shoe adjacent said arcuate abutment and an arcuate slot formed in the other of said pawl and said one brake shoe and cooperating with said tab to resiliently maintain said one brake shoe in its nonbraking position.

* * * * *